United States Patent
Blumreiter et al.

(10) Patent No.: US 11,674,462 B2
(45) Date of Patent: Jun. 13, 2023

(54) SYSTEMS AND METHODS OF CYLINDER DEACTIVATION IN HIGH-TEMPERATURE MIXING-CONTROLLED ENGINES

(71) Applicant: ClearFlame Engines, Inc., Geneva, IL (US)

(72) Inventors: Julie Blumreiter, Batavia, IL (US); Bernard Johnson, Chicago, IL (US); Robert Schanz, Aurora, IL (US); Manohar Vittal, Naperville, IL (US)

(73) Assignee: ClearFlame Engines, Inc., Geneva, IL (US)

( * ) Notice: Subject to any disclaimer, the term of this patent is extended or adjusted under 35 U.S.C. 154(b) by 0 days.

(21) Appl. No.: 17/490,501

(22) Filed: Sep. 30, 2021

(65) Prior Publication Data
US 2022/0018297 A1    Jan. 20, 2022

Related U.S. Application Data

(63) Continuation of application No. PCT/US2021/041109, filed on Jul. 9, 2021.
(Continued)

(51) Int. Cl.
*F02D 41/14* (2006.01)
*F02D 13/06* (2006.01)
*F02D 41/00* (2006.01)

(52) U.S. Cl.
CPC ......... *F02D 41/0087* (2013.01); *F02D 13/06* (2013.01); *F02D 41/1454* (2013.01);
(Continued)

(58) Field of Classification Search
CPC ............. F02D 41/0087; F02D 41/1454; F02D 41/1475; F02D 13/06; F02D 2200/101;
(Continued)

(56) References Cited

U.S. PATENT DOCUMENTS

| 5,768,887 | A  | 6/1998 | Nakamura et al. |
| 6,267,097 | B1 | 7/2001 | Urushihara et al. |

(Continued)

FOREIGN PATENT DOCUMENTS

| EP | 0116197 A2 | 8/1984 |
| EP | 3336336 A1 | 6/2018 |

(Continued)

OTHER PUBLICATIONS

Dhinagar, S.J. et al. (1995) "Spark-Assisted Alcohol Operation in a Low Heat Rejection Engine" International Congress and Exposition, Detroit, MI, Feb. 27-Mar. 2, 1995. Society of Automotive Engineers (SAE) Technical Paper Series, Paper No. 950059; 11 pages.

(Continued)

*Primary Examiner* — George C Jin
(74) *Attorney, Agent, or Firm* — Cooley LLP

(57) ABSTRACT

Embodiments described herein relate to systems and methods of cylinder deactivation in compression-ignition engines. An engine described herein can include N cylinders, with N being an integer of at least 2, with each cylinder including an inner surface, a piston disposed and configured to move in each cylinder of the N cylinders, an intake port, an exhaust port, and a fuel injector. The piston and the inner surface define a combustion chamber. A method of operating the compression ignition engine includes injecting a fuel into each of the combustion chambers, combusting substantially all of the fuel in the compression ignition engine, monitoring engine load of the compression ignition engine, and deactivating a cylinder of the N cylinders upon a decrease in load to less than $(N-1)/N \times FL$, wherein FL is a full load at a given engine speed.

27 Claims, 6 Drawing Sheets

Related U.S. Application Data

(60) Provisional application No. 63/049,763, filed on Jul. 9, 2020.

(52) U.S. Cl.
CPC .... *F02D 41/1475* (2013.01); *F02D 2200/101* (2013.01); *F02D 2200/602* (2013.01)

(58) Field of Classification Search
CPC .. F02D 2200/602; F02D 19/024; F02D 19/02; F02B 9/02; F02B 9/04
See application file for complete search history.

(56) References Cited

U.S. PATENT DOCUMENTS

| | | | |
|---|---|---|---|
| 6,340,003 B1 | 1/2002 | Schoubye et al. | |
| 6,401,688 B2 | 6/2002 | Teraji et al. | |
| 6,530,209 B2 | 3/2003 | Kuwabara et al. | |
| 6,557,520 B2 | 5/2003 | Roberts, Jr. | |
| 6,612,294 B2 | 9/2003 | Hiraya et al. | |
| 6,814,059 B2 | 11/2004 | Ito et al. | |
| 6,858,048 B1 | 2/2005 | Jimeson et al. | |
| 6,966,295 B2 | 11/2005 | Yamaoka et al. | |
| 7,017,561 B1 | 3/2006 | Liu et al. | |
| 7,059,281 B2 | 6/2006 | Kuo et al. | |
| 7,363,911 B2 | 4/2008 | Brehob | |
| 7,461,628 B2 | 12/2008 | Blumberg et al. | |
| 7,559,961 B2 | 7/2009 | Jimeson et al. | |
| 7,621,262 B2 | 11/2009 | Zubeck | |
| 7,743,754 B2 | 6/2010 | Cheiky | |
| 7,770,545 B2 | 8/2010 | Morgenstern | |
| 7,909,019 B2 | 3/2011 | Stein | |
| 7,954,474 B2 | 6/2011 | Tripathi et al. | |
| 7,971,567 B2 | 7/2011 | Zubeck et al. | |
| 8,006,672 B2 | 8/2011 | Krenus et al. | |
| 8,028,678 B2 | 10/2011 | Stein | |
| 8,141,356 B2 | 3/2012 | Leone et al. | |
| 8,235,024 B2 | 8/2012 | Zubeck et al. | |
| 8,245,690 B2 | 8/2012 | Stein | |
| 8,327,823 B2 | 12/2012 | Courtoy et al. | |
| 8,327,831 B2 | 12/2012 | Sturman | |
| 8,352,166 B2 | 1/2013 | Surnilla et al. | |
| 8,353,270 B2 | 1/2013 | Ulrey et al. | |
| 8,359,168 B2 | 1/2013 | Lepsch et al. | |
| 8,365,701 B1 | 2/2013 | Sturman | |
| 8,495,974 B2 | 7/2013 | Agosta | |
| 8,495,983 B2 | 7/2013 | Zubeck et al. | |
| 8,511,281 B2 | 8/2013 | Tripathi et al. | |
| 8,555,852 B2 | 10/2013 | Munshi et al. | |
| 8,590,505 B2 | 11/2013 | Simmons et al. | |
| 8,590,506 B2 | 11/2013 | Lee et al. | |
| 8,646,437 B2 | 2/2014 | Sales | |
| 8,689,767 B1 | 4/2014 | Dec et al. | |
| 8,783,227 B2 | 7/2014 | Yamakawa et al. | |
| 8,875,685 B2 | 11/2014 | McNeil | |
| 8,904,994 B2 | 12/2014 | Michikawauchi et al. | |
| 8,935,996 B2 | 1/2015 | Mulye | |
| 8,944,036 B2 | 2/2015 | Klingbeil | |
| 9,038,608 B2 | 5/2015 | Vigild et al. | |
| 9,046,064 B2 | 6/2015 | Sales | |
| 9,097,219 B2 | 8/2015 | Sales | |
| 9,109,498 B2 | 8/2015 | Bradley et al. | |
| 9,234,468 B2 | 1/2016 | Coldren | |
| 9,234,482 B2 | 1/2016 | Bromberg et al. | |
| 9,243,579 B2 | 1/2016 | Pruemm | |
| 9,249,740 B2 | 2/2016 | Matsuda et al. | |
| 9,291,110 B2 | 3/2016 | Matsuda et al. | |
| 9,410,509 B2 | 8/2016 | Roth et al. | |
| 9,447,724 B2 | 9/2016 | Morris et al. | |
| 9,499,043 B2 | 11/2016 | Zocher et al. | |
| 9,512,808 B2 | 12/2016 | Cleary | |
| 9,518,543 B2 | 12/2016 | Kosuge et al. | |
| 9,546,617 B2 | 1/2017 | Fujimoto et al. | |
| 9,556,845 B2* | 1/2017 | Sasaki | F02M 53/06 |
| 9,587,553 B2 | 3/2017 | Fischer | |
| 9,593,284 B2 | 3/2017 | Morris | |
| 9,689,320 B2 | 6/2017 | Yagi et al. | |
| 9,752,514 B2 | 9/2017 | Amaral et al. | |
| 9,790,868 B2 | 10/2017 | Huang et al. | |
| 9,810,139 B2 | 11/2017 | Gruber et al. | |
| 9,850,808 B2 | 12/2017 | Kare et al. | |
| 9,874,191 B2 | 1/2018 | Xiao et al. | |
| 9,903,262 B2 | 2/2018 | Edwards et al. | |
| 9,932,894 B2 | 4/2018 | Sturman | |
| 9,976,517 B2 | 5/2018 | Fiveland et al. | |
| 10,030,589 B1 | 7/2018 | Kim | |
| 10,054,085 B2 | 8/2018 | Foege | |
| 10,066,554 B2 | 9/2018 | Casamassima | |
| 10,082,109 B2 | 9/2018 | Engfehr et al. | |
| 10,100,719 B2 | 10/2018 | Moore | |
| 10,119,482 B1 | 11/2018 | Kim | |
| 10,174,703 B2 | 1/2019 | Zhou | |
| 10,197,019 B2 | 2/2019 | Shimada et al. | |
| 10,253,688 B2 | 4/2019 | Arboleda | |
| 10,273,914 B2 | 4/2019 | Windbergs | |
| 10,301,991 B1 | 5/2019 | Dudar | |
| 10,458,307 B2 | 10/2019 | Doers et al. | |
| 10,494,992 B2 | 12/2019 | Johnson et al. | |
| 2003/0167758 A1* | 9/2003 | Brown | B01J 23/40 60/299 |
| 2005/0060929 A1* | 3/2005 | Caprotti | C10L 1/191 44/354 |
| 2005/0126551 A1 | 6/2005 | Mello et al. | |
| 2007/0204830 A1 | 9/2007 | Andri | |
| 2008/0230041 A1 | 9/2008 | Brusslar et al. | |
| 2011/0000470 A1 | 1/2011 | Roth | |
| 2011/0048372 A1* | 3/2011 | Dibble | F02D 41/1401 123/478 |
| 2011/0072787 A1 | 3/2011 | Hubbard et al. | |
| 2011/0265770 A1 | 11/2011 | Malfa et al. | |
| 2012/0204832 A1 | 8/2012 | Baur et al. | |
| 2015/0027424 A1* | 1/2015 | Von Der Osten-Sack | F02M 43/00 123/704 |
| 2015/0240758 A1 | 8/2015 | Fujimoto et al. | |
| 2016/0108857 A1 | 4/2016 | Kanafani | |
| 2016/0237362 A1 | 8/2016 | Olah et al. | |
| 2017/0022924 A1 | 1/2017 | Fujimoto et al. | |
| 2017/0030279 A1* | 2/2017 | Bartsch | F02D 41/005 |
| 2017/0159581 A1* | 6/2017 | Mccarthy, Jr. | F02D 13/06 |
| 2017/0370308 A1 | 12/2017 | Hashemi et al. | |
| 2018/0030907 A1 | 2/2018 | Bhosekar et al. | |
| 2018/0180013 A1 | 6/2018 | Sellnau et al. | |
| 2018/0209326 A1 | 7/2018 | Sturman | |
| 2018/0306098 A1 | 10/2018 | Edwards et al. | |
| 2019/0032618 A1* | 1/2019 | Soleri | B08B 17/06 |
| 2019/0085776 A1 | 3/2019 | Tate, Jr. et al. | |
| 2019/0218993 A1* | 7/2019 | Sunley | F02D 41/0007 |
| 2019/0249597 A1 | 8/2019 | Asai | |
| 2019/0285027 A1 | 9/2019 | Pontet | |
| 2019/0309696 A1 | 10/2019 | Youso et al. | |
| 2019/0323457 A1 | 10/2019 | Rohrssen et al. | |
| 2019/0390627 A1 | 12/2019 | Youso et al. | |
| 2021/0054777 A1 | 2/2021 | Blumberg et al. | |

FOREIGN PATENT DOCUMENTS

| | | |
|---|---|---|
| EP | 3524800 A1 | 8/2019 |
| JP | 59-152031 A | 8/1984 |
| JP | 64-080756 A | 3/1989 |
| WO | WO 2014/108969 A1 | 7/2014 |
| WO | WO 2016/023752 A1 | 2/2016 |
| WO | WO 2016/118482 A1 | 7/2016 |
| WO | WO 2016/125380 A1 | 8/2016 |
| WO | WO 2019/017060 A1 | 1/2019 |
| WO | WO 2021/174016 A1 | 9/2021 |

OTHER PUBLICATIONS

Fleisch, T. et al. (1995) "A New Clean Diesel Technology: Demonstration of ULEV Emissions on a Navistar Diesel Engine Fueled with Dimethyl Ether" International Congress and Exposition, Detroit,

(56) References Cited

OTHER PUBLICATIONS

MI, Feb. 27-Mar. 2, 1995. Society of Automotive Engineers (SAE) Technical Paper Series, Paper No. 950061; 14 pages.

Green, C.J. et al. (1990) "Dimethyl Ether as a Methanol Ignition Improver: Substitution Requirements and Exhaust Emissions Impact" International Fuels and Lubricants Meeting and Exposition, Tulsa, OK, Oct. 22-25, 1990. Society of Automotive Engineers (SAE) Technical Paper Series, Paper No. 902155; pp. 79-88.

Johnson, B. and C. Edwards (Apr. 8, 2013) "Exploring the Pathway to High Efficiency IC Engines through Exergy Analysis of Heat Transfer Reduction" SAE Int. J. Engines, 6(1):150-166; doi:10.4271/2013-01-0278.

Miyamoto, N. et al. (1998) "Smokeless, Low NOx, High Thermal Efficiency, and Low Noise Diesel Combustion with Oxygenated Agents as Main Fuel" International Congress and Exposition, Detroit, MI, Feb. 23-26, 1998. Society of Automotive Engineers (SAE) Technical Paper Series, Paper No. 980506; 9 pages.

Ryan, T.W. et al. (1994) "Combustion and Emissions Characteristics of Minimally Processed Methanol in a Diesel Engine Without Ignition Assist" International Congress and Exposition, Detroit, MI, Feb. 28-Mar. 3, 1994, Society of Automotive Engineers (SAE) Technical Paper Series, Paper No. 940326; 10 pages.

Shen, M. et al. (Apr. 8, 2013) "Close to Stoichiometric Partially Premixed Combustion—The Benefit of Ethanol in Comparison to Conventional Fuels" Society of Automotive Engineers (SAE) Technical Paper Series, Paper No. 2013-01-0277, doi:10.4271/2013-01-0277; 16 pages.

Siebers, D.L. and C.F. Edwards (1987) "Auto Ignition of Methanol and Ethanol Sprays under Diesel Engine Conditions" International Congress and Exposition, Detroit, MI, Feb. 23-27, 1987. Society of Automotive Engineers (SAE) Technical Paper Series, Paper No. 870588; 16 pages.

Toepel, R.R. et al. (1983) "Development of Detroit Diesel Allison 6V-92TA Methanol Fueled Coach Engine", Fuels and Lubricants Meeting, San Francisco, CA, Oct. 31-Nov. 3, 1983. Society of Automotive Engineers (SAE) Technical Paper Series, Paper No. 831744; 20 pages.

\* cited by examiner

SYSTEMS AND METHODS OF CYLINDER DEACTIVATION IN HIGH-TEMPERATURE MIXING-CONTROLLED ENGINES

CROSS-REFERENCE TO RELATED APPLICATIONS

This application is a continuation of International Patent Application No. PCT/US2021/041109, filed Jul. 9, 2021 and entitled "Systems and Methods of Cylinder Deactivation in High-Temperature Mixing-Controlled Engines," which claims priority and benefit of U.S. Provisional Application No. 63/049,763, filed Jul. 9, 2020 and entitled "Systems and Methods of Cylinder Deactivation: Maintaining Stoichiometric Air-Fuel Ratio in a Heavy-Duty Engine," the entire disclosures of which are hereby incorporated by reference herein in their entireties.

TECHNICAL FIELD

The present disclosure relates to methods and arrangements for controlling internal combustion engines capable of using a variety of non-traditional fuels in direct-injection, compression ignited, high-temperature engines.

BACKGROUND

Criteria pollutants from internal combustion engines are tightly regulated by agencies including the Environmental Protection Agency (EPA). While engines are equipped with aftertreatment systems to treat criteria pollutants (such as three-way catalytic converters, selective catalytic reduction systems, etc.) to reduce levels of carbon monoxide (CO), hydrocarbons (HC), and nitrous oxides ($NO_x$), the way the engine is operated can affect "engine-out emissions," namely the emissions levels exiting the engine itself and prior to the aftertreatment system. Engine-out emissions levels can be affected by factors such as the engine's air/fuel ratio, peak combustion temperature, and dilution with exhaust gas. Therefore, it is important for engines to have precise control over factors such as the air-fuel ratio, thermal management, and exhaust utilization for management of pollutants.

SUMMARY

Embodiments described herein relate to systems and methods of cylinder deactivation in compression-ignition engines. An engine described herein can include N cylinders, with N being an integer of at least 2, with each cylinder including an inner surface, a piston disposed and configured to move in each cylinder of the N cylinders, an intake port, an exhaust port, and a fuel injector. The piston and the inner surface define a combustion chamber. A method of operating the compression ignition engine includes injecting a fuel into each of the combustion chambers, combusting substantially all of the fuel in the compression ignition engine, monitoring engine load of the compression ignition engine, and deactivating a cylinder of the N cylinders upon a decrease in load to less than $(N-1)/N \times FL$, wherein FL is a full load at a given engine speed. In some embodiments, the fuel can satisfy a stoichiometric condition with respect to an intake air quantity entering each of the combustion chambers. In some embodiments, the air/fuel ratio can be lean with respect to the intake air quantity entering each of the combustion chambers. In some embodiments, the method can further include recirculating a portion of exhaust from the exhaust ports back into the combustion chambers via the intake ports. In some embodiments, the compression-ignition engine can include a three-way catalytic converter, and the three-way catalytic converter can reduce emissions of CO, HC, and $NO_x$. In some embodiments, deactivating the cylinder can include closing an intake valve of the cylinder, closing an exhaust valve of the cylinder, and/or deactivating the fuel injector fluidically coupled to the cylinder.

DETAILED DESCRIPTION

Figure 1:
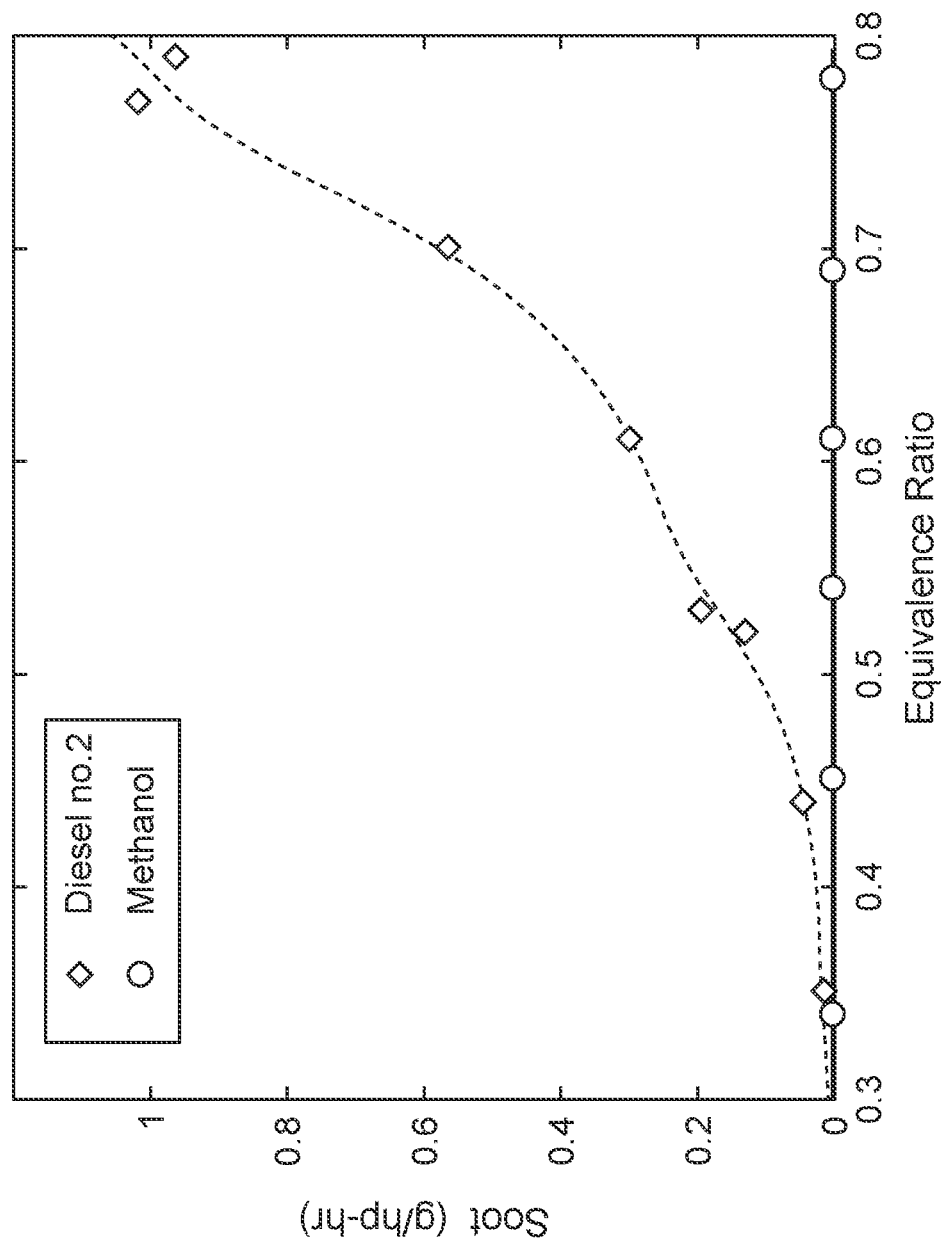
FIG. 1 shows particulate matter (soot) emission measurements for diesel and methanol as a function of equivalence ratio.

Embodiments described herein relate to systems and methods of management of compression ignition (CI) engine operation, including cylinder deactivation (CDA). To address the needs in the art, CDA is used to reduce the effective displacement of a direct-injected, compression ignited multi-cylinder engine during part-load operation. During CDA, selected cylinders in the multi-cylinder engine are systematically disabled, thereby reducing the engine's effective displacement. The disabled cylinders do not deliver any power and the remaining (working) cylinders therefore operate at a proportionally higher load. The amount of exhaust gas retention (EGR) used for intake charge dilution at low loads is thus lowered by CDA relative to using EGR alone to control the engine's output. By lowering the level of EGR needed for load control, CDA minimizes the potentially detrimental effect of EGR upon the stability of the combustion process and the combustion efficiency. The fuel injector injecting into each working cylinder can be governed by the ECU to inject a quantity that satisfies a stoichiometric condition with respect to the amount of fresh air in that cylinder. Consequently, the engine can be operated with a stoichiometric mixture, allowing control of CO, HC, and $NO_x$ using a conventional three-way catalytic converter. In some embodiments, the fuel injector injecting into each working cylinder can satisfy a non-stoichiometric condition with respect to the amount of air in that cylinder. In some embodiments, the engine can be operated using dilution, temperature, or other means to reduce engine-out criteria emissions. In some embodiments, the fuel injector injecting into each working cylinder can satisfy a fuel-rich condition with respect to the amount of air in that cylinder. In some embodiments, the fuel injector injecting into each working cylinder can satisfy a fuel-lean condition with respect to the amount of air in that cylinder.

In some embodiments, CDA is achieved by deactivating the intake valves and the exhaust valves for the disabled cylinders in a multi-cylinder engine. A similar effect can be achieved by leaving one or more valves open continuing throughout the cycle (should geometry permit).

Precise control of an air-fuel ratio into an engine can be achieved via closed-loop control of the air-fuel ratio by an engine control unit (ECU). The ECU can use feedback from an exhaust oxygen sensor to adjust the amount of fuel delivered in order to maintain the air fuel ratio near a stoichiometric level ($\phi=1$). In some embodiments the oxygen sensor feedback can be used to maintain the air fuel ratio near a non-stoichiometric level. The oxygen sensor can be installed upstream of a catalytic converter or other aftertreatment device(s). A second oxygen sensor can be installed downstream of the catalytic converter or other aftertreatment device(s) to further improve the precision of air fuel ratio control.

Modern closed-loop-controlled three-way catalytic converters are relatively simple, inexpensive, and reliable. However, commercially available diesel engines often run with lean mixtures over their operating range. Therefore, diesel engines are often not fitted with conventional three-way catalysts for control of CO, HC, and $NO_x$. The low combustion efficiency of diesel engines at stoichiometric conditions can result in poor fuel economy and excessive emissions of particulate matter (e.g., soot). In order to avoid excessive soot formation, the air-fuel ratio in heavy-duty diesel engines is often maintained above 25:1, with the corresponding fuel-air equivalence ratio ($\phi \approx 0.6$), well below the stoichiometric equivalence ratio of 1. Therefore, operating with a stoichiometric strategy and controlling emissions via a three-way catalyst is often not an option for diesel engines. Because the stoichiometry is lean, CO, HC, soot, and $NO_x$ are generally controlled via diesel oxidation catalysts (DOC), diesel particulate filters (DPF), and selective catalytic reduction (SCR).

Figure 2:
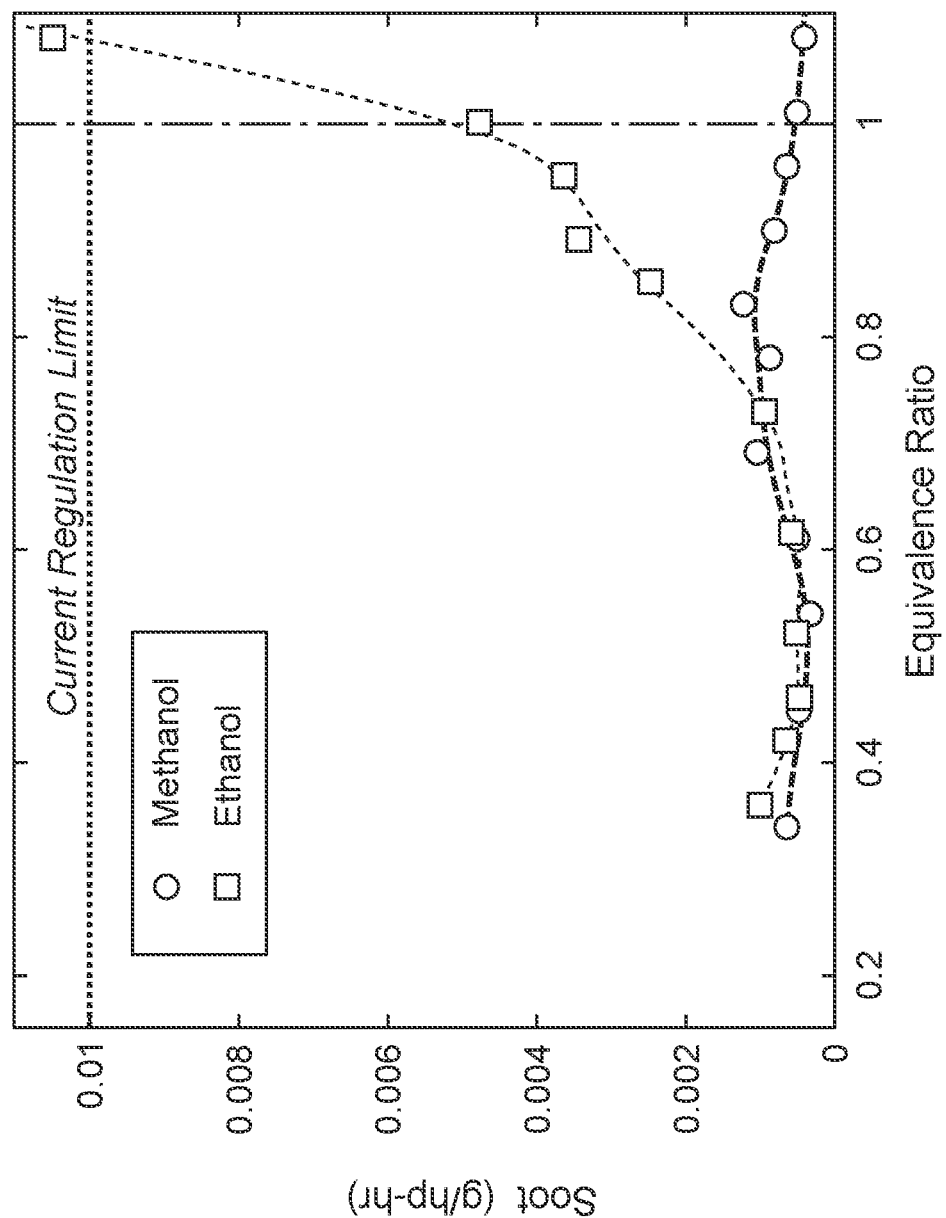
FIG. 2 shows particulate matter emission measurements for methanol and ethanol as a function of equivalence ratio.

Additionally, the inherently low soot emissions from low-carbon and/or oxygenated fuels—including but not limited to alcohols (e.g., methanol and ethanol), liquified natural gas (LNG), propane, ammonia, hydrogen ($H_2$), dimethyl ether (DME)—make them attractive choices for stoichiometric combustion in direct-injected, compression ignited engines provided their poor ignitability (with the exception of DME) can be overcome. Methods and arrangements for achieving consistent autoignition of such fuels in heavy-duty direct-injection, compression ignited engines using a high-temperature combustion strategy are described in U.S. Pat. No. 9,903,262 ("the '262 patent"), filed Apr. 6, 2015, entitled "Stoichiometric High-Temperature Direct-Injection Compression-Ignition Engine," the disclosure of which is hereby incorporated by reference in its entirety. FIG. 1 shows experimentally measured soot emissions for diesel and methanol fuels as a function of equivalence ratio (see '262 patent). Diesel operation at equivalence ratios greater than about 0.6 can often result in impractically high levels of soot. In contrast, soon emissions are nearly zero for operation on methanol across the same range of equivalence ratios. FIG. 2 shows soot emissions for methanol and ethanol from the same engine as FIG. 1. Both methanol and ethanol can be direct injected with high fuel loadings up to stoichiometric conditions while maintaining soot levels well below the current regulation limits. Similarly, fuels like DME, LNG, propane, and $H_2$ can be direct injected with fuel loadings up to stoichiometric conditions without forming soot in excess of current regulations.

Beyond strictly lean diesel operation which is limited in maximum fuel/air ratio by soot formation, and strictly stoichiometric operation, the low-sooting characteristics of low-carbon and/or oxygenated fuels (listed above) provide an opportunity to operate at richer operation than diesel, but still overall fuel lean air-fuel ratios. This allows for engine tuning for low criteria pollutants, such as lowering engine-out $NO_x$, without the constraint of soot formation that would otherwise impede such operation for an engine operating on diesel or diesel-like fuels. In these cases, emissions control devices such as diesel oxidation catalyst (DOC) and/or selective catalytic reduction (SCR) can be used for criteria pollutant control, but the size and complexity of these devices can be reduced, while a diesel particulate filter (DPF) can be eliminated. Alternatively, the low engine-out criteria emissions can enable the engine to reach lower emissions than are possible for diesel fuel, even under overall fuel lean conditions.

Most internal combustion engines also operate under a wide variety of different loads. In most gasoline engines, the power output (i.e., load) is controlled by using a throttle to regulate the flow of air into the cylinders. In contrast, engine load control in diesel engines is implemented by adjusting the fuel quantity instead of throttling the air, which leads to varying air-fuel ratio across the load range.

Many engines, both SI and CI, use EGR to lower the amount of $NO_x$ produced during the combustion process. The tri-atomic nature of combustion products ($CO_2$, $H_2O$) that are present in exhaust gases can moderate the combustion process and lower peak combustion temperatures. In many engines, it is desirous to use higher levels of EGR to reduce levels of engine-out $NO_x$, but there are also practical limitations to the amount of EGR that can be used.

The direct-injected compression ignition engine described in the '262 patent replaces a portion of the fresh charge with EGR in order to regulate the power output of the engine for part-load operation without deviating from the overall stoichiometric air-fuel ratio. The ECU governs the fuel injector to deliver a stoichiometric amount of fuel with respect to the amount of intake air. This strategy allows unthrottled, stoichiometric operation across much of the engine speed-load map whilst minimizing exhaust pollutants using a closed-loop-controlled three-way catalytic converter.

A large-displacement, multi-cylinder heavy-duty engine often uses only a fraction of its maximum power during light-load operation. An EGR-diluted stoichiometric combustion strategy for low-load operation uses higher and higher levels of EGR as the load demand on the engine becomes lower and lower. Similarly, a diesel engine operation uses increasing excess air at a decreasing load. In other words, an EGR-diluted stoichiometric engine uses EGR for dilution, while a diesel engine primarily uses excess air for dilution and a small amount of EGR for lowering $NO_x$ emissions.

Generally, the chemical properties of different fuels limit how much EGR may be used, as does the choice of combustion mode. For example, methanol and ethanol are both more tolerant to EGR than gasoline in spark-ignition (SI) engines. The EGR tolerance of a given combustion system can also improve with the use of high in-cylinder turbulence, elevated temperatures, and an increased compression ratio. However, in practice, EGR-diluted operation is generally limited by deteriorating combustion stability, incomplete combustion, or soot formation. More specifically, greater statistic variability in pressure, power output, and other characteristic properties from one cycle to another can make EGR-diluted combustion less reliable with increasing EGR levels in SI engines or decreasing combustion efficiency (i.e., fuel conversion) in CI engines. Soot is formed when diesel and diesel-like fuels are used in a mixing-controlled combustion mode, and soot formation generally increases as EGR levels increase. In addition, the amount of EGR that can be used before combustion becomes unstable decreases as engine load decreases, as less energy is available to sustain rapid and efficient combustion. A complementary strategy that can work in tandem with EGR to control the output and engine-out emissions levels of a neat-fuel, direct-injected, compression ignited internal combustion engine of the '262 can aid in addressing these issues.

Another limitation on the amount of EGR that may be used is soot formation—diesel fuel and other diesel-like molecules require sufficient excess air to avoid excessive soot formation during mixing-controlled combustion in a CI engine. Fuels like ethanol, methanol, DME, or other oxygenated or small molecule fuels can allow for higher levels of EGR to be used without threat of high soot formation. In this way, the properties of the fuel allow for the engine to be operated with lower engine-out criteria emissions than is possible using soot-producing fuels like diesel.

Even in combustion engines of the '262 patent, as EGR dilution increases, combustion stability and/or combustion efficiency decreases. The relevant physics relate to mixing of fuel with the air/EGR mixture such that fuel molecules and fuel fragments encounter and react with oxygen molecules. Provided mixing is achieved, there is also a need for enough thermal energy for these reactions to take place. At lighter loads, the fuel energy is lower due to the reduced amount of fuel. This makes exhaust temperatures lower. Accordingly, since a high temperature combustion cycle depends on the exhaust temperatures of previous cycles, there can be challenges in sustaining sufficient thermal energy to ignite low-cetane fuels described herein. Even if sufficient thermal energy can be maintained, or even imparted from an outside source such as a heater, the dilution of the air/EGR mixture the fuel is injected into slows the combustion reactions by reducing the probability of collisions between oxygen and fuel molecules. This is because some collisions will be between fuel and inert EGR components. For this reason, there are practical limitations in using EGR dilution to maintain stoichiometric conditions across the entire load range of engine operation.

Beyond the in-cylinder phenomena of the combustion process, the mechanics of recirculating exhaust can also become limiting above a certain level. In some cases in which EGR is circulated from the exhaust manifold through a pipe that connects to the engine's air intake manifold, a pressure differential must exist with exhaust pressure high enough above intake manifold pressure to motivate sufficient mass to circulate through the EGR loop. This is often accomplished by modulating exhaust back-pressure imposed by the turbocharger with respect to the intake air compressor. Beyond a certain level of EGR circulation, circulation of a large amount of mass back from exhaust to intake can become inefficient, resulting in lower system performance or sub-optimal fuel economy.

In some embodiments, recirculating large amount of exhaust can be accomplished using an EGR pump or blower, that can overcome any lack of or insufficient pressure gradient from exhaust to intake. This can be a level of complexity too high for some applications, and the in-cylinder limitations on maximum EGR fraction still apply.

Embodiments described herein can address combustion stability, combustion efficiency, and/or the challenge of circulating large amounts of EGR. Regarding these three issues, the first of these limitations that is reached, prior to the other two becoming a limitation, would define a threshold of maximum EGR. Which limitation is encountered first would depend on the operating point, the particular engine, the fuel choice, the combustion mode, and/or several other factors.

Compression ignition engine operation with low-soot fuels is described in greater detail in U.S. Patent publication No. 2021/0054777 (the '777 publication), filed Nov. 9, 2020, entitled "Cold-Start for High-Octane Fuels in a Diesel Engine Architecture," and in International Patent application No. PCT/US2021/019930 (the '930 publication), filed Feb. 26, 2021, entitled, "Fuel Agnostic Compression Ignition Engine," the disclosures of which are hereby incorporated in their entireties.

Embodiments described herein include a synergistic combination of engine load control strategies for a direct-injected, compression ignited, multi-cylinder heavy-duty engine. The methods and arrangements described in the '262 patent can create conditions in the combustion chamber (i.e., inside the cylinder) suitable to auto-ignite alcohols such as methanol and ethanol. The inherently low-soot forming nature of alcohol fuels enables them to be directly injected with high fuel loadings or with higher EGR dilution than diesel fuels can tolerate. The fuel injector can be commanded by the ECU to deliver a quantity of fuel with respect to the commanded load, and an EGR valve or EGR control device can deliver a desired level of exhaust to mix with the intake air. Such a strategy allows unthrottled, operation across most of the engine speed-load map with a desired EGR loading and air/fuel ratio, allowing engine-out exhaust pollutants to be controlled. In other words, the load control strategies described here allow for an additional degree of freedom—engine displacement—when tuning the engine, beyond the degree of freedom already afforded by use of small-molecule fuels, namely freedom from soot constraints.

Under this strategy, the high levels of EGR required to achieve light load operation in a large displacement, multi-cylinder heavy-duty engine could potentially cause combustion stability and/or combustion efficiency to deteriorate. Embodiments described herein extend the low-load limit using a hybrid engine load control strategy that combines variable engine displacement with EGR-diluted operation to maintain stable operation of the working cylinders and a desired EGR dilution level or air/fuel ratio, to lower engine-out emissions.

CDA in tandem with controlled EGR and fueling can facilitate movement around a load map of an engine while maintaining a desired EGR dilution or air/fuel ratio. A more traditional application of CDA would be to maintain high exhaust temperatures by operating fewer cylinders at higher load to maintain equivalent power output. This can be done for the purpose of maintaining high temperature for exhaust aftertreatment systems. Innovations in control strategy can allow more continuous variation of load while maintaining high exhaust temperatures, or to avoid throttling in an SI engine. The benefits of maintaining a desired level of EGR dilution or air/fuel ratio enabled by CDA include meeting strict emissions standards with low engine-out emissions. This can be done in tandem with or in the absence of adjacent innovations such as advanced controls. Advanced controls are described in greater detail in U.S. Pat. No. 7,954,474 ("the '474 patent"), filed Nov. 9, 2009, entitled "Internal Combustion Engine Control for Improved Fuel Efficiency," and U.S. Pat. No. 8,511,281 ("the '281 patent"), filed Jul. 9, 2010, entitled "Skip Fire Engine Control," the entire disclosures of which are hereby incorporated by reference in their entireties. The benefits described herein include use of CDA on diesel-style engines for controlling level of dilution or air/fuel ratio.

Figure 3:
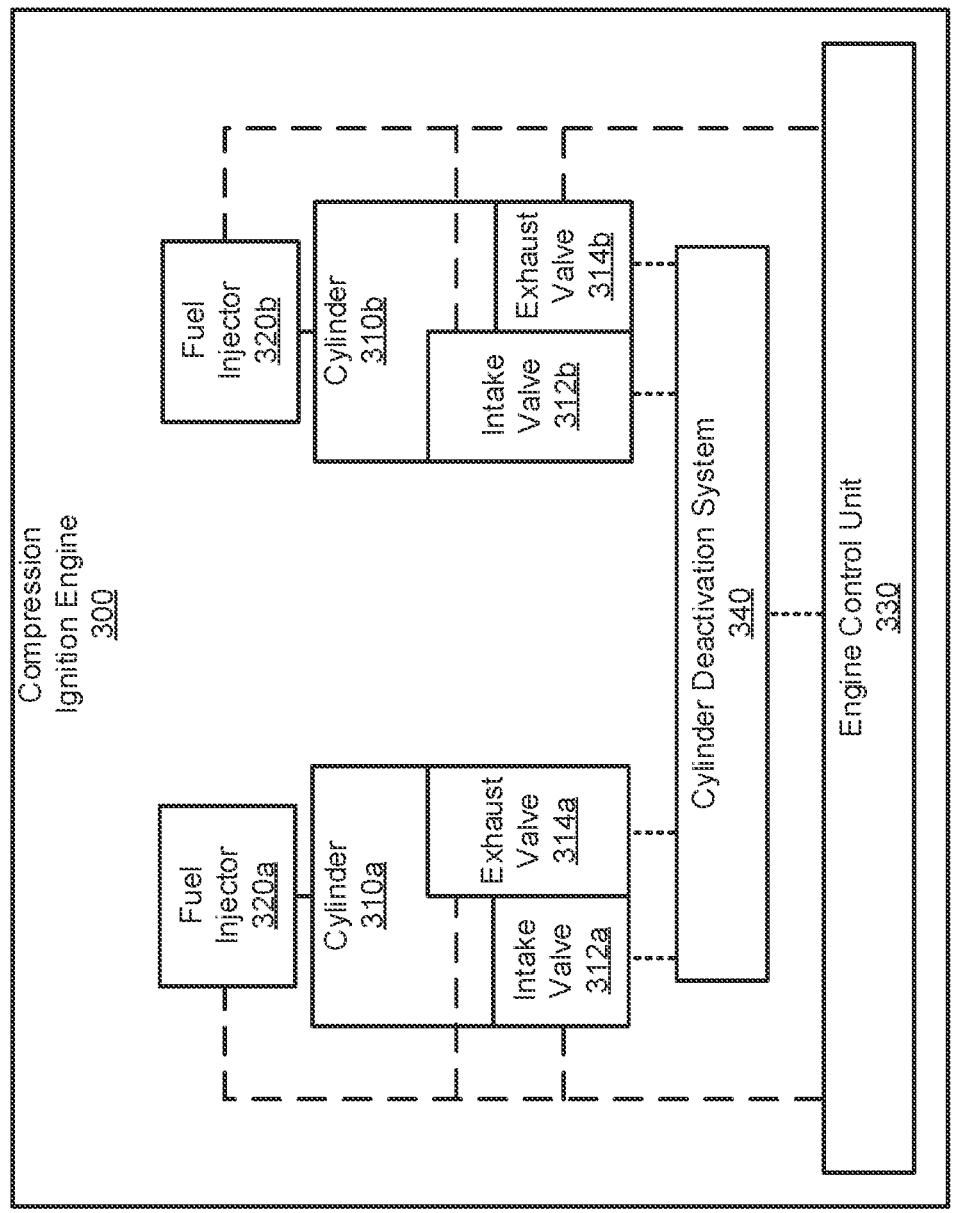
FIG. 3 is a block diagram of a compression ignition engine with a cylinder deactivation system, according to an embodiment.

FIG. 3 is a block diagram of a compression ignition engine 300 with a cylinder deactivation system, according to an embodiment. As shown, the compression ignition engine 300 includes cylinders 310a, 310b (collectively referred to as cylinders 310), intake valves 312a, 312b (collectively referred to as intake valves 312), exhaust valves 314a, 314b (collectively referred to as exhaust valves 314), fuel injectors 320a, 320b (collectively referred to as fuel injectors 320), an ECU 330, and a cylinder deactivation system (CDA system) 340. As shown, solid lines represent physical or fluidic couplings, while dotted lines represent virtual couplings or communication between devices. In some embodiments, the compression ignition engine 300 can have an engine displacement of at least about 0.5 L, at least about 1 L, at least about 2 L, at least about 3 L, at least about 4 L, at least about 5 L, at least about 6 L, at least about 7 L, at least about 8 L, at least about 9 L, at least about 10 L, at least about 11 L, at least about 12 L, at least about 13 L, at least about 14 L, at least about 15 L, at least about 16 L, at least about 17 L, at least about 18 L, at least about 19 L, at least about 20 L, at least about 25 L, at least about 30 L, at least about 35 L, at least about 40 L, at least about 45 L, at least about 50 L, at least about 55 L, at least about 60 L, at least about 65 L, at least about 70 L, at least about 75 L, at least about 80 L, at least about 85 L, at least about 90 L, or at least about 95 L. In some embodiments, the compression ignition engine 300 can have an engine displacement of no more than about 100 L, no more than about 95 L, no more than about 90 L, no more than about 85 L, no more than about 80 L, no more than about 75 L, no more than about 70 L, no more than about 65 L, no more than about 60 L, no more than about 55 L, no more than about 50 L, no more than about 45 L, no more than about 40 L, no more than about 35 L, no more than about 30 L, no more than about 20 L, no more than about 19 L, no more than about 18 L, no more than about 17 L, no more than about 16 L, no more than about 15 L, no more than about 14 L, no more than about 13 L, no more than about 12 L, no more than about 11 L, no more than about 10 L, no more than about 9 L, no more than about 8 L, no more than about 7 L, no more than about 6 L, no more than about 5 L, no more than about 4 L, no more than about 3 L, no more than about 2 L, or no more than about 1 L. Combinations of the above-referenced engine displacements are also possible (e.g., at least about 0.5 L and no more than about 100 L or at least about 2 L and no more than about 10 L or at least about 19 L and no more than about 95 L), inclusive of all values and ranges therebetween. In some embodiments, the compression ignition engine 300 can have an engine displacement of about 0.5 L, about 1 L, about 2 L, about 3 L, about 4 L, about 5 L, about 6 L, about 7 L, about 8 L, about 9 L, about 10 L, about 11 L, about 12 L, about 13 L, about 14 L, about 15 L, about 16 L, about 17 L, about 18 L, about 19 L, about 20 L, about 25 L, about 30 L, about 35 L, about 40 L, about 45 L, about 50 L, about 55 L, about 60 L, about 65 L, about 70 L, about 75 L, about 80 L, about 85 L, about 90 L about 95 L, or about 100 L.

In some embodiments, the compression ignition engine 300 can include a four-stroke engine. In some embodiments, the compression ignition engine 300 can include a two-stroke engine. In some embodiments, the compression ignition engine 300 can include a five-stroke engine. In some embodiments, the compression ignition engine 300 can include a six-stroke engine.

As shown, the cylinders 310 include the intake valves 312 and the exhaust valves 314. In some embodiments, each of the cylinders 310 can include an inner surface, a head surface, and/or a piston disposed in each of the cylinders 310. In some embodiments, the inner surface, the head surface, the piston, the intake valve 312, and the exhaust valve 314 can form a combustion chamber.

As shown, the intake valves 312 and exhaust valves 314 are included in each of the cylinders 310. The intake valves 312 can cover intake ports (not shown) and the intake valves 312 can be opened to uncover the intake ports (i.e., to allow fluid flow through the intake ports). The exhaust valves 314 can cover exhaust ports (not shown) and the exhaust valves 314 can be opened to uncover the exhaust ports (i.e., to allow fluid flow through the exhaust ports). In some embodiments, one or more of the cylinders 310 can be absent of the intake valves 312 and the exhaust valves 314 and simply include the intake ports and the exhaust ports. As a non-limiting example of such an embodiment, a two-stroke engine can be absent of intake valves and/or exhaust valves.

As shown, the compression ignition engine 300 includes 2 cylinders 310. In some embodiments, the compression ignition engine 300 can include 1 cylinder, 3 cylinders, 4 cylinders, 5 cylinders, 6 cylinders, 7 cylinders, 8 cylinders, 9 cylinders, 10 cylinders, 11 cylinders, 12 cylinders, 13 cylinders, 14 cylinders, 15 cylinders, 16 cylinders, 17 cylinders, 18 cylinders, 19 cylinders, 20 cylinders, 21 cylinders, 22 cylinders, 23 cylinders, 24 cylinders, 25 cylinders, 26 cylinders, 27 cylinders, 28 cylinders, 29 cylinders, 30 cylinders, 31 cylinders, or 32 cylinders, inclusive of all values and ranges therebetween.

In some embodiments, the cylinders 310 can each include multiple pistons. In some embodiments, the cylinders 310 can include pistons in an opposed-piston configuration. In some embodiments, the cylinders 310 can be implemented in a split-single engine design. In some embodiments, one or more of the cylinders 310 can include an ignition-assist device. In some embodiments, one or more of the cylinders 310 can include a spark plug disposed therein for spark-assisted compression ignition. In some embodiments, one or more of the cylinders 310 can include a glow plug. In some embodiments, one or more of the cylinders 310 can include a plasma heating device. Ignition-assist devices are further described in the '777 publication.

In some embodiments, the intake valves 312 and the exhaust valves 314 can be opened and closed via a variable valve timing (VVT) scheme. In some embodiments, a VVT scheme can be implemented during transitional phases of the compression ignition engine 300. For example, the VVT scheme can be implemented when transitioning between a cold-start and a steady state operation of the compression ignition engine. Further implementations of VVT schemes are described in the '777 publication.

In some embodiments, one or more of the fuel injectors 320 can be disposed directly in the cylinders 310. In some embodiments, one or more of the fuel injectors 320 can be disposed outside of the cylinders 310. In some embodiments, one or more of the fuel injectors 320 can be disposed in an intake port (not shown) of the compression ignition engine. In some embodiments, the fuel injectors 320 can inject a volume of fuel at an injection pressure of at least about 800 bar (absolute), at least about 900 bar, at least about 1,000 bar, at least about 1,100 bar, at least about 1,200 bar, at least about 1,300 bar, at least about 1,400 bar, at least about 1,500 bar, at least about 1,600 bar, at least about 1,700 bar, at least about 1,800 bar, at least about 1,900 bar, at least about 2,000 bar, at least about 2,100 bar, at least about 2,200 bar, at least about 2,300 bar, at least about 2,400 bar, at least about 2,500 bar, at least about 2,600 bar, at least about 2,700 bar, at least about 2,800 bar, or at least about 2,900 bar. In some embodiments, the fuel injectors 320 can inject a volume of fuel at an injection pressure of no more than about 3,000 bar, no more than about 2,900 bar, no more than about 2,800 bar, no more than about 2,700 bar, no more than about 2,600 bar, no more than about 2,500 bar, no more than about 2,400 bar, no more than about 2,300 bar, no more than about 2,200 bar, no more than about 2,100 bar, no more than about 2,000 bar, no more than about 1,900 bar, no more than about 1,800 bar, no more than about 1,700 bar, no more than about 1,600 bar, no more than about 1,500 bar, no more than about 1,400 bar, no more than about 1,300 bar, no more than about 1,200 bar, no more than about 1,100 bar, no more than about 1,000 bar, or no more than about 900 bar.

Combinations of the above-referenced injection pressures are also possible (e.g., at least about 800 bar and no more than about 3,000 bar or at least about 1,200 bar and no more than about 2,000 bar), inclusive of all values and ranges therebetween. In some embodiments, the fuel injectors 320 can inject a volume of fuel at an injection pressure of about 800 bar, about 900 bar, about 1,000 bar, about 1,100 bar, about 1,200 bar, about 1,300 bar, about 1,400 bar, about 1,500 bar, about 1,600 bar, about 1,700 bar, about 1,800 bar, about 1,900 bar, about 2,000 bar, about 2,100 bar, about 2,200 bar, about 2,300 bar, about 2,400 bar, about 2,500 bar, about 2,600 bar, about 2,700 bar, about 2,800 bar, about 2,900 bar, or about 3,000 bar.

As shown, the ECU 330 is virtually connected to the fuel injectors 320, the intake valves 312, the exhaust valves 314, and the CDA system 340, and can control the fuel injectors 320, the intake valves 312, the exhaust valves 314, and the CDA system 340. In some embodiments, the ECU 330 can adjust the air-fuel ratio based on an oxygen reading in the exhaust stream. In some embodiments, the ECU 330 can maintain a stoichiometric ratio of fuel and air. In some embodiments, the ECU 330 can maintain a non-stoichiometric ratio of fuel and air. In some embodiments, the ECU 330 can reduce or increase pressure of the fuel injectors 320. In some embodiments, the ECU 330 can modify the timing of the opening of the intake valves 312 and/or the exhaust valves 314 (e.g., in the employment of a VVT scheme). In some embodiments, the ECU 330 can modify the timing of the closing of the intake valves 312 and/or the exhaust valves 314. In some embodiments, the ECU 330 can control the implementation of an EGR strategy. In some embodiments, the ECU 330 can control the amount of exhaust that gets re-routed back to the intake of the compression ignition engine 300. In other words, the ECU 330 can control a recirculation path (not shown) that can partition a portion of exhaust gas such that the portion of exhaust gas is rerouted. In some embodiments, the ECU 330 can be in communication with an oxygen sensor (not shown) that measures oxygen content in the exhaust. In some embodiments, the ECU 330 can communicate with the recirculation path and adjust the amount of exhaust recirculated, based on the oxygen content sensed by the oxygen sensor. In some embodiments, the fuel and air fed into the compression ignition engine 300 can be maintained at a lean ratio based on the oxygen content sensed by the oxygen sensor. In some embodiments, the compression ignition engine 300 can include an oxygen sensor and no catalytic converter.

In some embodiments, the fuel injectors 320 can include a closed-loop-controlled fuel injector. In some embodiments, the compression ignition engine 300 can include an EGR path. In some embodiments, the closed-loop-controlled fuel injector and the EGR path can maintain precise control of thermal management and combustion dilution in the compression ignition engine 300. In some embodiments, the closed-loop-controlled fuel injector and the EGR path can minimize criteria pollutants exiting the compression ignition engine 300. In some embodiments, the engine can be equipped with a three-way catalytic converter. The closed-loop-controlled fuel injector, the EGR path, and the three-way catalytic converter can reduce exhaust gas emissions of CO, hydrocarbons and $NO_x$.

As shown, the CDA system 340 is virtually connected to the ECU 330 and is mechanically and/or fluidically coupled to the intake valves 312 and exhaust valves 314. In some embodiments, the CDA system 340 can exist as a separate controller or control system from the ECU 330. In some embodiments, the CDA system 340 can include CDA hardware and a CDA control module. The CDA hardware can be in physical contact, in hydraulic contact, and/or in communication with the intake valves 312 and the exhaust valves 314. In some embodiments, the CDA hardware can be in physical contact, hydraulic contact, and/or in communication with the fuel injectors 320. The CDA control module can be in communication with and/or in contact with the intake valves 312, the exhaust valves 314, and the fuel injectors 320. In some embodiments, the CDA system 340 can deactivate the intake valve 312 and/or the exhaust valve 314 of one or more of the cylinders 310. In some embodiments, the ECU 330 can deactivate the fuel injector 320 of one or more of the cylinders 310. In some embodiments, the CDA system 340 can deactivate one of the intake valves 312 and/or one of the exhaust valves 314 when the engine load of the compression ignition engine 300 decreases to less than or equal to $(N-1)/N \times FL$, where N is the number of cylinders in the compression ignition engine 300 and FL is a full load at the engine speed of the compression ignition engine 300. In some embodiments, the ECU 330 can deactivate one of the fuel injectors 320 when the engine load of the compression ignition engine 300 decreases to less than or equal to $(N-1)/N \times FL$. For example, if the compression ignition engine 300 has 4 cylinders 310, the CDA system 340 can deactivate one of the cylinders 310 when the engine load decreases to less than or equal to 75% of the full load. In some embodiments, FL can be defined by the manufacturer. In some embodiments, FL can be defined by calibrations or modifications done by the user. In other words, FL can be based on a calibrated value based on tunings the user applies to the compression ignition engine 300. In some embodiments, FL can be defined by the total displacement of the compression ignition engine 300. In some embodiments, FL can be defined by physical limitations of the compression ignition engine 300 such as peak pressure. In some embodiments, FL can be defined by physical limitations of the compression ignition engine 300, multiplied by a safety factor (e.g., 0.5, 0.55, 0.6, 0.65, 0.7, 0.75, 0.8, 0.85, 0.9, 0.95, inclusive of all values and ranges therebetween.). In some embodiments, FL can be the maximum power output as demanded by the user or the equipment.

In some embodiments, the compression ignition engine 300 can include a boosting device (not shown). In some embodiments, the compression ignition engine 300 can include an intake manifold (not shown) fluidically coupled to the intake valves 312 and the boosting device. In some embodiments, the boosting device can increase pressure in the intake manifold. In some embodiments, the boosting device can include a turbocharger, a supercharger, and/or a turbo-compounding device. In some embodiments, the CDA system 340 can operate based on load demanded by the driver (e.g., via the position of a gas pedal). In some embodiments, the CDA controller 340 can operate based on a commended load. In some embodiments, the CDA system 340 can reactivate a cylinder based on the load demanded by the driver. In some embodiments, the CDA system 340 can reactivate a cylinder based on a commanded load. In some embodiments, the CDA system 340 can reactivate a cylinder to navigate the compression ignition engine 300 from a lower load to a higher load.

Figure 4:
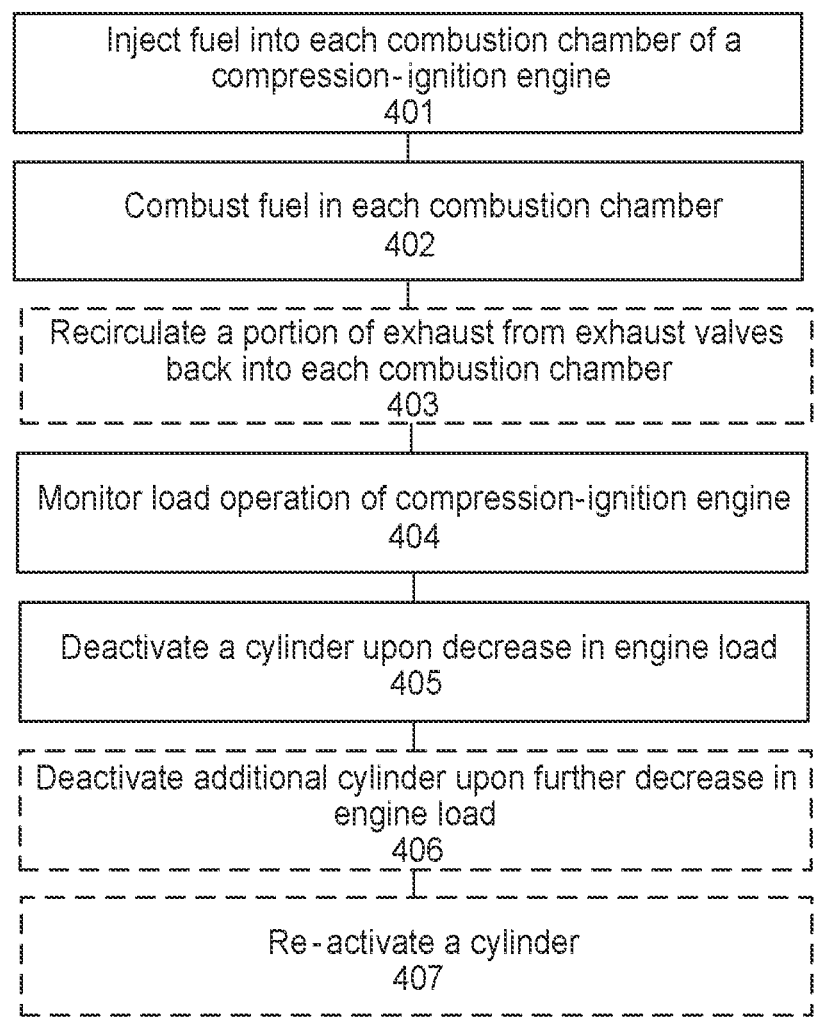
FIG. 4 is a block diagram of a method of operating a compression ignition engine with a cylinder deactivation system, according to an embodiment.

FIG. 4 shows a method 400 of operating a compression ignition engine, according to an embodiment. As shown, the method 400 includes injecting a fuel into each combustion chamber of a compression ignition engine at step 401, combusting the fuel in each combustion chamber at step 402, optionally recirculating a portion of exhaust from exhaust valves back into each combustion chamber at step 403, monitoring load operation of the compression ignition engine at step 404, and deactivating a cylinder upon a decrease in the engine load at step 405. In some embodiments, the method 400 can further include deactivating an additional cylinder upon a further decrease in the engine load at step 406. In some embodiments, the method 400 can include re-activating a cylinder at step 407.

Step 401 includes injecting fuel into each combustion chamber. In some embodiments, a piston, a head surface of a cylinder, an intake valve, and an exhaust valve can define the combustion chamber. In some embodiments, the fuel can include a fuel with 1 carbon atom per molecule (e.g., methane, methanol). In some embodiments, the fuel can be free of carbon atoms (e.g., hydrogen). In some embodiments, the fuel can include a fuel with at least about 1 carbon atom per molecule, at least about 2 carbon atoms per molecule, at least about 3 carbon atoms per molecule, at least about 4 carbon atoms per molecule, at least about 5 carbon atoms per molecule, at least about 6 carbon atoms per molecule, at least about 7 carbon atoms per molecule, at least about 8 carbon atoms per molecule, or at least about 9 carbon atoms per molecule. In some embodiments, the fuel can include a fuel with no more than about 10 carbon atoms per molecule, no more than about 9 carbon atoms per molecule, no more than about 8 carbon atoms per molecule, no more than about 7 carbon atoms per molecule, no more than about 6 carbon atoms per molecule, no more than about 5 carbon atoms per molecule, no more than about 4 carbon atoms per molecule, no more than about 3 carbon atoms per molecule, or no more than about 2 carbon atoms per molecule. Combinations of the above-referenced numbers of carbon atoms per molecule are also possible (e.g., at least about 1 carbon atom per molecule and no more than about 10 carbon atoms per molecule or at least about 1 carbon atom per molecule and no more than about 3 carbon atoms per molecule), inclusive of all values and ranges therebetween. In some embodiments, the fuel can include a fuel with about 1 carbon atom per molecule, about 2 carbon atoms per molecule, about 3 carbon atoms per molecule, about 4 carbon atoms per molecule, about 5 carbon atoms per molecule, about 6 carbon atoms per molecule, about 7 carbon atoms per molecule, about 8 carbon atoms per molecule, about 9 carbon atoms per molecule, or about 10 carbon atoms per molecule.

In some embodiments, the fuel can have a cetane number of at least about −10, at least about −5, at least about 0, at least about 5, at least about 10, at least about 15, at least about 20, at least about 25, at least about 30, or at least about 35. In some embodiments, the fuel can have a cetane number of no more than about 40, no more than about 35, no more than about 30, no more than about 25, no more than about 20, no more than about 15, no more than about 10, no more than about 5, no more than about 0, or no more than about −5. Combinations of the above-referenced cetane numbers of the fuel are also possible (e.g., at least about −10 and no more than about 40 or at least about 10 and no more than about 20), inclusive of all values and ranges therebetween. In some embodiments, the fuel can have a cetane number of about −10, about −5, about 0, about 5, about 10, about 15, about 20, about 25, about 30, about 35, or about 40.

In some embodiments, the fuel can include naphtha, gasoline, alcohol, butanol, propanol, ethanol, methanol, a gasoline/ethanol mixture, a gasoline/methanol mixture, methanol/ethanol mixture, a denatured alcohol, hydrous alcohol, gaseous hydrocarbons, natural gas, methane, ethane, propane, butane, hexane, alternative fuels, hydrogen, ammonia, syngas, and/or CO. In some embodiments, the fuel can have a low amount of additives that result in a substantial change in cetane number. In some embodiments, the fuel can include less than about 5,000 ppm, less than about 4,000 ppm, less than about 3,000 ppm, less than about 2,000 ppm, less than about 1,000 ppm, less than about 900 ppm, less than about 800 ppm, less than about 700 ppm, less than about 600 ppm, or less than about 500 ppm by weight of additives that result in a substantial change in cetane number. In some embodiments, the fuel can be substantially free of additives that result in a substantial change in cetane number.

In some embodiments, the fuel can include additives for other purposes that do not result in a substantial change in cetane number (e.g., a lubricity additive). In some embodiments, the fuel can include less than about 5,000 ppm, less than about 4,000 ppm, less than about 3,000 ppm, less than about 2,000 ppm, less than about 1,000 ppm, less than about 900 ppm, less than about 800 ppm, less than about 700 ppm, less than about 600 ppm, or less than about 500 ppm by weight of additives that do not result in a substantial change in cetane number. In some embodiments, the fuel can be substantially free of additives that do not result in a substantial change in cetane number. In some embodiments, the fuel can include at least about 50 ppm, at least about 100 ppm, at least about 200 ppm, at least about 300 ppm, at least about 400 ppm, at least about 500 ppm, at least about 600 ppm, at least about 700 ppm, at least about 800 ppm, at least about 900 ppm, at least about 1,000 ppm, at least about 2,000 ppm, at least about 3,000 ppm, or at least about 4,000 ppm of additives that do not result in a substantial change in cetane number. Combinations of the above-referenced ranges of additives that do not result in a substantial change in cetane number (e.g., at least about 50 ppm and no more than about 5,000 ppm or at least about 1,000 ppm and no more than about 4,000 ppm), inclusive of all values and ranges therebetween. In some embodiments, the fuel can include about 50 ppm, about 100 ppm, about 200 ppm, about 300 ppm, about 400 ppm, about 500 ppm, about 600 ppm, about 700 ppm, about 800 ppm, about 900 ppm, about 1,000 ppm, about 2,000 ppm, about 3,000 ppm, about 4,000 ppm, or about 5,000 ppm of additives that do not result in a substantial change in cetane number.

In some embodiments, the fuel can have an octane number (i.e., calculated via (RON+MON)/2 method) of at least about 50, at least about 55, at least about 60, at least about 65, at least about 70, at least about 75, at least about 80, at least about 85, at least about 90, at least about 95, at least about 100, at least about 105, at least about 110, at least about 115, at least about 120, at least about 125, at least about 130, at least about 135, at least about 140, or at least about 145. In some embodiments, the fuel can have an octane number of no more than about 150, no more than about 145, no more than about 140, no more than about 135, no more than about 130, no more than about 125, no more than about 120, no more than about 115, no more than about 110, no more than about 105, no more than about 100, no more than about 95, no more than about 90, no more than about 85, no more than about 80, no more than about 75, no more than about 70, no more than about 65, no more than about 60, or no more than about 55. Combinations of the above-referenced octane numbers are also possible (e.g., at least about 50 and no more than about 150 or at least about 80 and no more than about 120, inclusive of all values and ranges therebetween. In some embodiments, the fuel can have an octane number of about 50, about 55, about 60, about 65, about 70, about 75, about 80, about 85, about 90, about 95, about 100, about 105, about 110, about 115, about 120, about 125, about 130, about 135, about 140, about 145, or about 150.

In some embodiments, the fuel can have a flash point of at least about 0° C., at least about 5° C., at least about 10° C., at least about 15° C., at least about 20° C., at least about 25° C., at least about 30° C., at least about 35° C., at least about 40° C., or at least about 45° C. In some embodiments, the fuel can have a flash point of no more than about 50° C., no more than about 45° C., no more than about 40° C., no more than about 35° C., no more than about 30° C., no more than about 25° C., no more than about 20° C., no more than about 15° C., no more than about 10° C., or no more than about 5° C. Combinations of the above-referenced flash points of the fuel are also possible (e.g., at least about 0° C. and no more than about 50° C. or at least about 10° C. and no more than about 40° C., inclusive of all values and ranges therebetween. In some embodiments, the fuel can have a flash point of about 0° C., about 5° C., about 10° C., about 15° C., about 20° C., about 25° C., about 30° C., about 35° C., about 40° C., about 45° C., or about 50° C.

In some embodiments, multiple fuels can be injected at step 401. In some embodiments, multiple fuels can be injected separately at step 401. In some embodiments, multiple fuels can be injected as a mixture at step 401. In some embodiments, the fuel can be injected at any of the pressures or pressure ranges noted for the fuel injectors 320, as described above with reference to FIG. 3.

Step 402 includes combusting the fuel in each combustion chamber. This can include moving the piston from a bottom-dead-center (BDC) position to a top-dead-center (TDC) position to induce autoignition of the injected fuel. In some embodiments, the movement of the piston from the BDC position to the TDC position can be with a compression ratio of at least about 10:1, at least about 11:1, at least about 12:1, at least about 13:1, at least about 14:1, at least about 15:1, at least about 16:1, at least about 17:1, at least about 18:1, at least about 19:1, at least about 20:1, at least about 21:1, at least about 22:1, at least about 23:1, at least about 24:1, at least about 25:1, at least about 26:1, at least about 27:1, at least about 28:1, or at least about 29:1. In some embodiments, the movement of the piston from the BDC position to the TDC position can be with a compression ratio of no more than about 30:1, no more than about 29:1, no more than about 28:1, no more than about 27:1, no more than about 26:1, no more than about 25:1, no more than about 24:1, no more than about 23:1, no more than about 22:1, no more than about 21:1, no more than about 20:1, no more than about 19:1, no more than about 18:1, no more than about 17:1, no more than about 16:1, no more than about 15:1, no more than about 14:1, no more than about 13:1, no more than about 12:1, or no more than about 11:1.

Combinations of the above-referenced compression ratios are also possible (e.g., at least about 10:1 and no more than about 30:1 or at least about 13:1 and no more than about 20:1), inclusive of all values and ranges therebetween. In some embodiments, the movement of the piston from the BDC position to the TDC position can be with a compression ratio of about 10:1, about 11:1, about 12:1, about 13:1, about 14:1, about 15:1, about 16:1, about 17:1, about 18:1, about 19:1, about 20:1, about 21:1, about 22:1, about 23:1, about 24:1, about 25:1, about 26:1, about 27:1, about 28:1, about 29:1, or about 30:1.

In some embodiments, combusting the fuel at step 402 can include facilitating combustion via an ignition-assist device (e.g., spark plug, glow plug, etc.). In some embodiments, step 402 can include combusting substantially all of the fuel injected at step 401. In some embodiments, less than 50% of the volume of fuel can be pre-mixed with the volume of air upon initiation of combustion. In other words, the ignition of the volume of fuel can be mixing controlled compression ignition, or MCCI. In some embodiments, at least about 5%, at least about 10%, at least about 15%, at least about 20%, at least about 25%, at least about 30%, at least about 35%, at least about 40%, or at least about 45% of the volume of fuel can be pre-mixed with the volume of air upon initiation of combustion. In some embodiments, no more than about 50%, no more than about 45%, no more than about 40%, no more than about 35%, no more than about 30%, no more than about 25%, no more than about 20%, no more than about 15%, or no more than about 10% of the volume of fuel can be pre-mixed with the volume of air upon initiation of combustion. Combinations of the above-referenced percentages of the volume of fuel pre-mixed with the volume of air are also possible (e.g., at least about 5% and no more than about 50% or at least about 10% and no more than about 40%), inclusive of all values and ranges therebetween. In some embodiments, about 5%, about 10%, about 15%, about 20%, about 25%, about 30%, about 35%, about 40%, about 45%, or about 50% of the volume of fuel can be pre-mixed with the volume of air upon initiation of combustion. In some embodiments, the local equivalence ratio at points within the combustion chamber can be at least about 1.5, at least about 2, at least about 3, at least about 4, at least about 5, at least about 6, at least about 7, at least about 8, at least about 9, or at least about 10, inclusive of all values and ranges therebetween.

Optional step 403 includes recirculating a portion of exhaust from the exhaust valves back into each of the active combustion chambers. In some embodiments, the recirculation can be via a recirculation path. In some embodiments, initial EGR dilution can start from 0% or a desired baseline level (as is used in traditional diesel engines for $NO_x$ control). In some embodiments, the initial EGR dilution can be about 5%, about 10%, about 15%, about 20%, about 25%, about 30%, about 35%, or about 40%, inclusive of all values and ranges therebetween. In some embodiments, EGR dilution can increase during operation of the compression ignition engine. In some embodiments, EGR dilution can increase during operation to at least about 10%, at least about 20%, at least about 30%, at least about 40%, at least about 50%, at least about 60%, at least about 70%, or at least about 80% of the exhaust from the exhaust valves can be recirculated back into each of the active combustion chambers. In some embodiments, EGR dilution can increase during operation to no more than about 90%, no more than about 80%, no more than about 70%, no more than about 60%, no more than about 50%, no more than about 40%, no more than about 30%, or no more than about 20% of the exhaust from the exhaust valves can be recirculated back into each of the active combustion chambers. Combinations of the above-referenced percentages of EGR are also possible (e.g., at least about 10% and no more than about 90% or at least about 20% and no more than about 60%), inclusive of all values and ranges therebetween. In some embodiments, EGR dilution can increase to about 10%, about 20%, about 30%, about 40%, about 50%, about 60%, about 70%, about 80%, or about 90% of the exhaust from the exhaust valves can be recirculated back into each of the active combustion chambers. In some embodiments, the recirculated exhaust can be proportioned equally or approximately equally between the combustion chambers. In some embodiments, the amount of recirculation can be based on an amount of oxygen sensed in the exhaust.

Step 404 includes monitoring the load operation of the compression ignition engine, while step 405 includes deactivating a cylinder upon a decrease in engine load. In some implementations, a move from a high to a low load using CDA and EGR in tandem can include starting from a highest desired load point and lowering the load. In some embodiments, the highest desired load point can coincide with the initial EGR dilution. As the desired load decreases from a maximum value to a load of less than or equal to (N−1)/N×FL at a given RPM, the first opportunity for CDA is reached. At this point, step 405 includes deactivating a cylinder. In some embodiments, deactivating the cylinder at step 405 can be in response to the cylinders of the compression ignition engine operating outside of a prescribed or desired load range. For example, the user can prescribe that each cylinder operates between 65% and 90% of FL for that cylinder in a four-cylinder engine. Upon the load in at least one of the cylinders decreasing to less than 65%, one of the four cylinders can be deactivated, placing a higher load on each of the remaining active cylinders and increasing the load on each cylinder back into the prescribed range. In some embodiments, an air flow rate into each of the activated cylinders can be reduced to maintain a desired air-fuel ratio. In some embodiments, deactivating a cylinder can aid in maintaining an air-fuel ratio in each of the cylinders, rather than having to adjust the air-fuel ratio in each of the cylinders in response to engine load. In some embodiments, the deactivating can aid in preserving a desired air-fuel ratio in the cylinders. In some embodiments, the deactivating can aid in preserving a substantially stoichiometric ratio in the cylinders. In some embodiments, the deactivating can aid in preserving a rich air-fuel ratio in the cylinders. In some embodiments, the deactivating can aid in preserving a lean air-fuel ratio in the cylinders.

In some embodiments, deactivating a cylinder at step 405 can include closing the intake valve of the cylinder, closing the exhaust valve of the cylinder, and/or deactivating the fuel injector fluidically coupled to the cylinder. In some embodiments, deactivating a cylinder at step 405 can include closing the intake port, closing the exhaust port, and/or deactivating the fuel injector fluidically coupled to the cylinder.

In some embodiments, deactivating a cylinder at step 405 can include deactivating the motion of the intake valve and exhaust valve prior to deactivating the fuel injector in order to trap combustion products other than air during the period of deactivation. This trapping can aid in maintaining an overall stoichiometric air/fuel ratio in the cylinder for operation of a catalytic converter.

In addition to CDA, traditional recirculated EGR, and fuel controlled by the engine ECU, there are additional enabling technologies that can be used in tandem to enhance the efficacy of CDA for stoichiometric operation in a diesel engine. In some embodiments, boost level can be used to control load and stoichiometry. Increasing boost (i.e., increasing the pressure in the intake manifold and thus the pressure and density of air going into the cylinder) allows for more air to be drawn into the cylinder at a fixed displacement. In other words, additional fuel can be added to maintain stoichiometry. This can be done in the absence of EGR or using a constant base EGR level. Further, it can be used in tandem with EGR and CDA to move through the load map while maintaining stoichiometry and maximizing brake thermal efficiency at each operating point. This can provide an additional degree of freedom for lowering load and maintaining the correct amount of intake air. Increasing EGR, lowering boost, and/or deactivating a cylinder can aid in lowering the load and maintaining the correct amount of intake air. In the absence of a device like an EGR pump, recirculated EGR control and boost level are linked since the back-pressure applied by the turbocharger must be sufficient to move EGR from exhaust to intake sides of the engine. Thus, more back pressure can provide a change in pressure when the boost pressure (on the intake side) is substantially high. In some embodiments, the method 400 can include complex boost/turbo configurations, including "e-boost" from BorgWarner, electric supercharging, and/or turbo-compounding, all of which allow de-coupling of the turbine work from compressor work in a boosted engine configuration imparting additional flexibility for system operation and optimization. In some embodiments, an EGR pump or other device can be used to move EGR from exhaust to intake in the absence of, or in cases of insufficient, pressure gradient to drive desired EGR flowrates, thereby largely decoupling EGR flow from exhaust and intake pressure.

The types of EGR that can be employed to vary load in combination with CDA are not limited to traditional recirculated exhaust as is common in diesel engines. Exhaust dilution can be accomplished by increasing exhaust back-pressure to increase the amount of trapped residual and VVT of exhaust valves and/or intake valves can be used to either trap or re-breathe exhaust gases to dilute incoming air. In some embodiments, combusted fuel can be trapped in the combustion chamber by maintaining the exhaust valve in a closed position.

Additionally, the control of intake air with EGR dilution and boost is not limited to intake manifold pressure alone. VVT for the intake valve can also be used to vary the amount of air or air/EGR combination drawn into the combustion chamber during the intake stroke. This can resemble a Miller cycle, or in the case of early exhaust valve closing can involve late intake valve opening to maintain roughly symmetric valve timing about TDC. Such strategies are described in the '777 publication. Valve timing to increase trapped EGR and/or reduce intake air can be used increasingly while load is lowered until a CDA threshold is reached allowing for valve timing to be reset. In the same way, CDA can circumvent excessive EGR dilution, it can also be used to circumvent excessively wide VVT requirements.

Step 406 is optional and includes deactivating an additional cylinder upon a further decrease in engine load. As load is lowered further with one cylinder already deactivated, the overall load can decrease to lower then (N−2)/

N×FL (e.g., via EGR). At that point a second cylinder can be deactivated, allowing the remaining N−2 cylinders to operate at full load. In some embodiments, 3, 4, 5, 6, 7, 8, 9, 10, 11, 12, 13, 14, 15, 16, 17, 18, 19, 20, 21, 22, 23, 24, 25, 26, 27, 28, 29, 30, or 31 cylinders can be deactivated, inclusive of all values and ranges therebetween, as engine load reaches the appropriate conditions.

Step 407 is optional and includes reactivating a cylinder. This can be in response to an increase in engine load. In other words, as the desired load increases from less than (N−1)/N×FL to greater than or equal to (N−1)/N×FL at a given RPM, a cylinder can be reactivated. This can include reactivating the intake valve, the exhaust valve, and/or the fuel injector. In some embodiments, reactivation of a cylinder can be based on an engine load approaching a value of (N−1)/N×FL. In some embodiments, reactivation of a cylinder can be based on an engine load reaching about 80%, about 85%, about 90%, about 95%, about 96%, about 97%, about 98%, or about 99% of (N−1)/N×FL, inclusive of all values and ranges therebetween. In some embodiments, reactivation of a cylinder can be based on a commended load. In some embodiments, reactivation of a cylinder can be based on the position of the gas pedal. In some embodiments, reactivation of a cylinder can be done to navigate the compression ignition engine from a lower load to a higher load.

Figure 5:
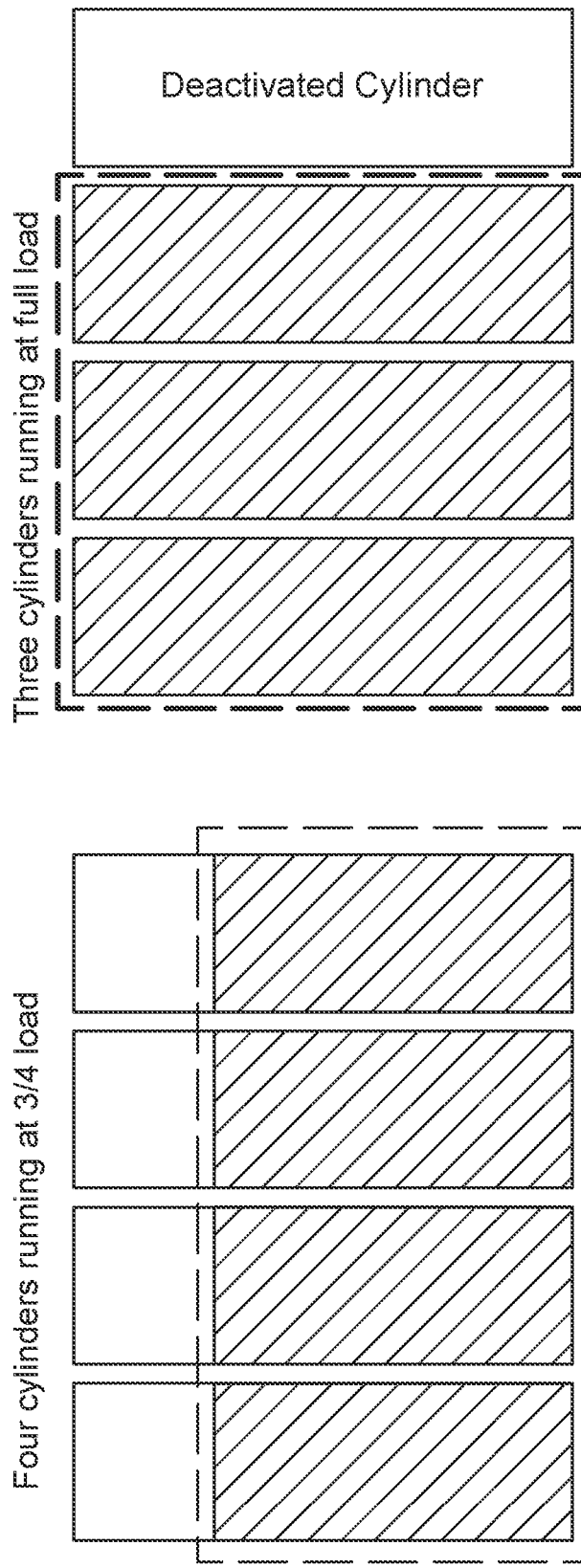
FIG. 5 shows a visual representation of equivalent load achieved using exhaust gas retention only and cylinder deactivation only.

FIG. 5 shows a visual representation of equivalent load achieved using EGR only and CDA only. FIG. 5 depicts a four-cylinder engine, although this strategy can work with any number of cylinders. The shaded area represents the fraction of load of the cylinder when compared to its full load. This is roughly equivalent to the amount of cylinder displacement being used for air intake, ignoring the minimal base level of EGR that may be desired for simplicity in this example. The unshaded area represents the portion of the cylinder volume consisting of EGR and a deactivated cylinder is labeled as such. In some embodiments, deactivating a cylinder can include suspending injection of fuel into said cylinder.

Figure 6:
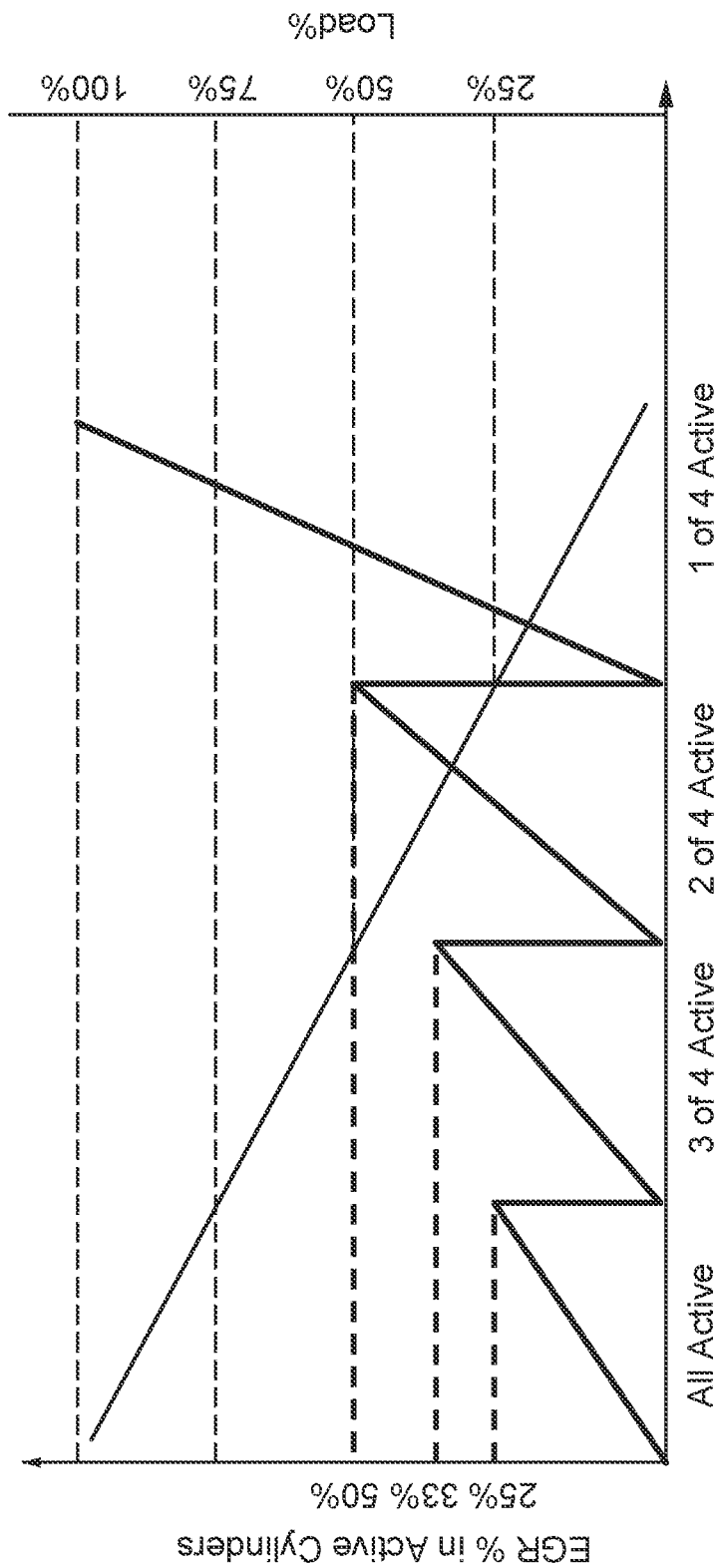
FIG. 6 shows a visual representation of decreasing load from 100%, deactivating one cylinder at a time of a four-cylinder engine, increasing EGR dilution in active cylinders until next threshold for deactivation is reached.

FIG. 6 shows a graphical representation of decreasing load from 100%, deactivating one cylinder at a time of a four-cylinder engine, increasing EGR dilution in active cylinders until the next threshold for deactivation is reached. As load is lowered further with one cylinder already deactivated, EGR dilution in the remaining active cylinders will increase until the overall load decreases to lower than ((N−2)/N)×FL. At that point a second cylinder can be deactivated, allowing the remaining N−2 cylinders to operate at full load. In the same manner that EGR dilution takes on a sawtooth shape in FIG. 6, valve timing to increase trapped EGR and/or reduce intake air can similarly be used increasingly while load is lowered until a CDA threshold is reached allowing for valve timing to be reset. In the same way CDA can circumvent excessive EGR dilution, it can also be used to circumvent excessively wide VVT requirements.

In some embodiments, an engine can employ the strategies described herein in parallel. While independent use of each of these methods is possible, their combination is within the scope of this disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "fuel" can refer to any material capable of producing an exothermic chemical reaction with an intake mixture, regardless of the fuel's cetane number. This can include fuels and blends of: naphtha, gasoline, alcohol fuels (including butanol, propanol, ethanol, and methanol), gaseous hydrocarbons (including natural gas, methane, ethane, propane, butane, hexane, etc.) and alternative fuels such as hydrogen, ammonia, dimethyl ether, (DME), syngas, CO, etc.

As used herein, "plume" can refer to a mass of fuel spreading from an injection point, which may be entraining or mixing with the volume of air as it progresses spatially and/or temporally during a fuel injection event.

As used herein, "combustion efficiency" can refer to the degree to which air and fuel are fully combusted to form the products of complete combustion. As a non-limiting example, combustion efficiency can be calculated using lower heating value (LHV) of the fuel (e.g., ethanol, methanol, etc.) and combustion products (e.g., $CO_2$, $H_2O$, etc.), as set forth below:

$$\eta_{combustion} = 1 - \frac{LHV_{products} mass_{products}}{LHV_{fuel} mass_{fuel}}$$

Where:
$\eta_{combustion}$ is the combustion efficiency;
$LHV_{products}$ is the LHV of the combustion products (MJ/kg);
$mass_{products}$ is the mass of the combustion products (kg);
$LHV_{fuel}$ is the LHV of the fuel (MJ/kg); and
$mass_{fuel}$ is the mass of the fuel (kg).

As used herein, "efficiency," "thermal efficiency," or "LHV efficiency" can refer to the conversion of fuel energy to mechanical work, calculated as follows:

$$\eta = \frac{\text{Work}}{LHV_{fuel} mass_{fuel}}$$

Where:
$\eta$ is the efficiency;
Work is the amount of mechanical work achieved (J), which can be the indicated work calculated from the pressure in the engine cylinder, or the brake work, where the work is measured at the point of the rotating shaft going from the engine into a transmission or generator (i.e., the "brake thermal efficiency);
$LHV_{fuel}$ is the LHV of the fuel (J/kg); and
$mass_{fuel}$ is the mass of the fuel (kg).

As used herein, a numerical definition of a "crank angle" or an "engine crank angle" should be understood as the crank angle relative to a fixed point in the engine cycle (as described below in Table 1 for the case of a four-stroke engine). In other words, in a four-stroke engine, the engine crank angle is 0° (or 720°) when the piston is in the TDC position between the exhaust stroke and the intake stroke. The engine crank angle is 360° when the piston is in the TDC position between the compression stroke and the expansion stroke. The engine crank angle is 540° when the piston is in the BDC position between the expansion stroke and the exhaust stroke. The engine crank angle is 180° when the piston is in the BDC position between the intake stroke and the compression stroke. Negative numbers can also be used to describe the crank angle relative to the TDC position between the exhaust stroke and the intake stroke. In other words, 540° can also be described as −180°, 360° can also be described as −360°, and 180° can also be described as −540°.

TABLE 1

Crank Angle Descriptions for a Four Stroke Engine

| Crank Angle (Degrees) | Piston Position | Stroke Description |
| --- | --- | --- |
| 360 (−360) | TDC | Between compression stroke and expansion stroke. In some literature, this crank angle is referred to as "TDC Combustion" |
| Between 360 and 540 (Between −360 and −180) | Transitioning from TDC to BDC | Expansion stroke |
| 540 (−180) | BDC | Between expansion stroke and exhaust stroke |
| Between 540 and 720 (Between −180 and 0) | Transitioning from BDC to TDC | Exhaust stroke |
| 0 or 720 | TDC | Between exhaust stroke and intake stroke. In some literature, this crank angle is referred to as "TDC gas exchange" |

TABLE 1-continued

Crank Angle Descriptions for a Four Stroke Engine

| Crank Angle (Degrees) | Piston Position | Stroke Description |
|---|---|---|
| Between 0 and 180 (Between −720 and −540) | Transitioning from TDC to BDC | Intake stroke |
| 180 (−540) | BDC | Between intake stroke and compression stroke |
| Between 180 and 360 (Between −540 and −360) | Transitioning from BDC to TDC | Compression stroke |
| 360 (−360) | TDC | Between compression stroke and expansion stroke. In some literature, this crank angle is referred to as "TDC Combustion" |

In some embodiments, the term "immediately prior to ignition" or "just prior to ignition" can refer to a temporal point, at which the engine crank angle (in a four stroke engine) is about 300°, about 305°, about 310°, about 315°, about 320°, about 325°, about 330°, about 335°, about 340°, about 345°, about 350°, about 355°, about 360°, about 365°, about 370°, about 375°, or about 380°, inclusive of all values and ranges therebetween. Similarly "immediately prior to ignition" or "just prior to ignition" can be used to refer to crank angles prior to and just after TDC combustion in a two, five, or six, stroke engine.

In some embodiments, the term "immediately prior to ignition" or "just prior to ignition" can refer to a temporal point preceding the time at which 5% of the fuel exothermicity is observed to have happened. In other words, the fuel can be considered to have ignited when a measurable deviation in pressure could be detected to indicate exothermic fuel oxidation is occurring.

In some embodiments, the term "immediately prior to ignition" or "just prior to ignition" can refer to a temporal point about 1 crank angle degree, about 2 crank angle degrees, about 3 crank angle degrees, about 4 crank angle degrees, about 5 crank angle degrees, about 6 crank angle degrees, about 7 crank angle degrees, about 8 crank angle degrees, about 9 crank angle degrees, about 10 crank angle degrees, about 11 crank angle degrees, about 12 crank angle degrees, about 13 crank angle degrees, about 14 crank angle degrees, about 15 crank angle degrees, about 16 crank angle degrees, about 17 crank angle degrees, about 18 crank angle degrees, about 19 crank angle degrees, or about 20 crank angle degrees prior to ignition, inclusive of all values and ranges therebetween.

In some embodiments, the term "immediately prior to fuel injection" or "just prior to fuel injection" can refer to a temporal point about 1 crank angle degree, about 2 crank angle degrees, about 3 crank angle degrees, about 4 crank angle degrees, about 5 crank angle degrees, about 6 crank angle degrees, about 7 crank angle degrees, about 8 crank angle degrees, about 9 crank angle degrees, about 10 crank angle degrees, about 11 crank angle degrees, about 12 crank angle degrees, about 13 crank angle degrees, about 14 crank angle degrees, about 15 crank angle degrees, about 16 crank angle degrees, about 17 crank angle degrees, about 18 crank angle degrees, about 19 crank angle degrees, or about 20 crank angle degrees prior to fuel injection, inclusive of all values and ranges therebetween.

In some embodiments, the term "valve closing" (e.g., "intake valve closing" or "exhaust valve closing") can refer to a temporal point, wherein the valve passes a threshold of distance from the valve seat (i.e., 0.1 mm valve lift). In some embodiments, the term "valve opening" (e.g., "intake valve opening" or "exhaust valve opening") can refer to a temporal point, wherein the valve passes a threshold of distance from the valve seat (i.e., 0.1 mm valve lift).

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of operating a compression ignition engine, the compression ignition engine including N cylinders, N being an integer of at least 2, each of the N cylinders having an inner surface, a piston disposed and configured to move in each cylinder of the N cylinders, an intake port, an exhaust port, an intake valve configured to allow and/or block fluid flow through the intake port, an exhaust valve configured to allow and/or block fluid flow through the exhaust port, and a fuel injector, the piston and the inner surface defining a combustion chamber, the method comprising:
  injecting a fuel into each of the combustion chambers, the fuel having a cetane number of less than about 40, the fuel substantially free of additives that result in a substantial change in cetane number;
  igniting the fuel via compression ignition in the compression ignition engine;
  combusting substantially all of the fuel in the compression ignition engine;
  monitoring engine load of the compression ignition engine; and
  deactivating a cylinder of the N cylinders upon a decrease in engine load to less than (N−1)/N×FL,
  wherein deactivating the cylinder includes deactivating motion of the intake valve and exhaust valve before deactivating the fuel injector in order to trap combustion products rather than air and maintain overall stoichiometric air/fuel ratio in the cylinder, and
  wherein FL is a full load at a given engine speed.

2. The method of claim 1, wherein the compression ignition engine further includes an exhaust aftertreatment control device.

3. The method of claim 1, wherein the deactivating is via a cylinder deactivation (CDA) system, the CDA system comprising CDA hardware and a CDA control module in communication and/or contact with the intake valves, the exhaust valves, and the fuel injectors.

4. The method of claim 1, wherein the air/fuel ratio is lean with respect to an intake air quantity entering each of the combustion chambers.

5. The method of claim 1, further comprising:
recirculating a portion of exhaust from the exhaust port back into the combustion chambers via the intake port.

6. The method of claim 1, wherein the fuel has an octane rating of at least about 100.

7. The method of claim 1, wherein the deactivating increases the engine load for each cylinder in response to the cylinders in the compression ignition engine operating outside of a prescribed load range.

8. The method of claim 1, further comprising:
reducing a flow rate of air into the combustion chambers to maintain a desired air-fuel ratio.

9. A method of operating a compression ignition engine, the compression ignition engine including a plurality of cylinders, each of the plurality of cylinders having an inner surface, a piston disposed and configured to move in the engine cylinder, an intake port, an exhaust port, an intake valve configured to allow and/or block fluid flow through the intake port, the exhaust valve configured to allow and/or block fluid flow through the exhaust port, and a fuel injector, the piston, the inner surface, the intake port, and the exhaust port defining a combustion chamber, the method comprising:
injecting a fuel into each of the combustion chambers, the fuel having a cetane number of less than about 40, the fuel substantially free of additives that result in a substantial change in cetane number;
igniting the fuel via compression ignition in the compression ignition engine;
combusting substantially all of the fuel in the compression ignition engine;
monitoring engine load of the compression ignition engine;
setting a predetermined load value; and
deactivating at least one cylinder of the plurality of cylinders upon a decrease in engine load to less than the predetermined load value,
wherein deactivating at least one cylinder includes deactivating motion of the intake valve and exhaust valve before deactivating the fuel injector in order to trap combustion products rather than air and maintain overall stoichiometric air/fuel ratio in the cylinder.

10. The method of claim 9, wherein the fuel satisfies a stoichiometric condition with respect to an intake air quantity entering each of the combustion chambers.

11. The method of claim 9, further comprising:
recirculating a portion of exhaust from the exhaust ports back into the combustion chambers via the intake ports.

12. The method of claim 9, wherein the predetermined load value is calculated as (N−D)/N×FL, wherein N is the number of cylinders in the compression ignition engine, D is the number of cylinders deactivated, and FL is a full load at a given engine speed.

13. The method of claim 9, further comprising:
re-activating the cylinder to navigate from lower load to higher load.

14. The method of claim 9, wherein the fuel has no more than about 3 carbon atoms per molecule.

15. The method of claim 9 wherein the fuel includes at least one of methanol, ethanol, propanol, butanol, gasoline/ethanol mixtures, gasoline/methanol mixtures, methanol/ethanol mixtures, denatured alcohol, hydrous alcohol, dimethyl ether, ammonia, hydrogen, propane, or natural gas.

16. A compression ignition engine, comprising:
a plurality of N cylinders, each of the N cylinders including:
an inner surface;
a piston disposed and configured to move in the engine cylinder;
an intake port;
an exhaust port;
an intake valve configured to allow and/or block fluid flow through the intake port;
an exhaust valve configured to allow and/or block fluid flow through the exhaust port; and
a fuel injector fluidically coupled to each of the N cylinders, the piston and the inner surface, defining a combustion chamber;
a fuel supply fluidically coupled to the fuel injector, the fuel supply configured to contain a fuel having a cetane number of less than about 40, the fuel substantially free of additives that result in a substantial change in cetane number;
an engine control unit (ECU) in communication with each of the fuel injectors, the ECU configured to deliver a quantity of a fuel to each of the cylinders; and
a cylinder deactivation (CDA) control module configured to deactivate D cylinders from the N cylinders when an engine load in the compression ignition engine decreases below (N−D)/N×FL, the CDA configured to deactivate motion of the intake valve and the exhaust valve before deactivating the fuel injector during a period of deactivation and maintain overall stoichiometric air/fuel ratio in the cylinder,
wherein FL is a full load at a given engine speed,
wherein N is an integer of at least 2, and
wherein D is an integer of at least 1.

17. The compression ignition engine of claim 16, wherein the fuel injectors include a closed-loop-controlled fuel injector, the compression ignition engine further including an EGR path,
wherein the closed-loop-controlled fuel injector, the EGR path, and the three-way catalytic converter are configured to reduce exhaust gas emissions of CO, hydrocarbons, and NOR.

18. The compression ignition engine of claim 16, wherein the ECU is configured to deliver a stoichiometric quantity of fuel to each of the cylinders.

19. The compression ignition engine of claim 16, further comprising:
an oxygen sensor configured to measure oxygen content in an exhaust stream exiting the cylinders via the exhaust ports.

20. The compression ignition engine of claim 16, wherein the fuel injectors include a closed-loop-controlled fuel injector, the compression ignition engine further including an EGR path,
wherein the closed-loop-controlled fuel injector and the EGR path are configured to maintain precise control of thermal management and combustion dilution and minimize criteria pollutants exiting the compression ignition engine.

21. The compression ignition engine of claim 16, wherein N is at least 3 and D is at least 2.

22. The compression ignition engine of claim 16, further comprising an intake manifold fluidically coupled to the intake ports and a boosting device, the boosting device configured to increase pressure in the intake manifold.

23. The compression ignition engine of claim 22, wherein the boosting device includes a turbocharger, a supercharger, and/or a turbo-compounding device.

24. The compression ignition engine of claim 16, wherein the CDA control module operates based on a position of a gas pedal.

25. The method of claim 2, wherein the exhaust aftertreatment control device controls CO, HC, soot, and/or $NO_x$ emissions via at least one of a diesel oxidation catalyst, selective catalytic reduction, or a three-way catalyst.

26. The method of claim 9, wherein the compression ignition engine further includes an exhaust aftertreatment control device, and the exhaust aftertreatment control device controls CO, HC, soot, and/or $NO_x$ emissions via at least one of a diesel oxidation catalyst, selective catalytic reduction, or a three-way catalyst.

27. The Compression ignition engine of claim 16, further comprising an exhaust aftertreatment control device configured to control CO, HC, soot, and/or $NO_x$ emissions, the exhaust aftertreatment control device including at least one of a diesel oxidation catalyst, a selective catalytic reduction device, or a three-way catalyst.

* * * * *